United States Patent [19]

Schorr

[11] Patent Number: 4,962,305

[45] Date of Patent: Oct. 9, 1990

[54] MOUNTING ARRANGEMENT FOR VERTICALLY MOUNTING A SCANNER

[75] Inventor: Theodore H. Schorr, Eugene, Oreg.

[73] Assignee: Spectra-Physics, Inc., San Jose, Calif.

[21] Appl. No.: 387,349

[22] Filed: Jul. 31, 1989

[51] Int. Cl.[5] ............................................. G06K 9/00
[52] U.S. Cl. ................................... 250/239; 250/234
[58] Field of Search ............... 250/234, 239; 235/462, 235/467, 470

[56] References Cited

U.S. PATENT DOCUMENTS

| | | | |
|---|---|---|---|
| 4,457,017 | 6/1984 | Onogi et al. | 250/239 |
| 4,652,732 | 3/1987 | Nickl | 235/467 |
| 4,713,532 | 12/1987 | Knowles | 235/470 |
| 4,789,775 | 12/1988 | McClain et al. | 235/470 |
| 4,861,973 | 8/1989 | Hellekson et al. | 235/470 |

Primary Examiner—David C. Nelms
Assistant Examiner—Stephone B. Allen
Attorney, Agent, or Firm—Killworth, Gottman, Hagan & Schaeff

[57] ABSTRACT

A mounting arrangement vertically mounts a scanner of the type which projects a laser light beam in a scan pattern to find a label on a package and read symbols thereon. The scanner has a housing, a window positioned on a first side of the scanner housing, power and communication cables emerging from a lateral side of the housing, and an optical system within the housing to project the beam through the window. The mounting arrangement includes a support plate for engaging a second side of the scanner housing opposite the first side. The support plate includes means for securing the plate to a horizontal surface. The mounting arrangement further includes a back cover for covering the side of the support plate on the side thereof opposite the scanner. Finally, the mounting arrangement includes a cable cover, securable to the support plate and to the back cover, for covering the cables emerging from the lateral side of the housing.

14 Claims, 5 Drawing Sheets

MOUNTING ARRANGEMENT FOR VERTICALLY MOUNTING A SCANNER

BACKGROUND OF THE INVENTION

The present invention relates generally to laser instruments and, more particularly, to a mounting arrangement for use with a laser scanner which projects a laser light beam in a scan pattern to facilitate finding a label on a package and reading the symbols on the label.

A wide variety of laser scanners have been designed to read bar code labels used on a broad range of retail packages for check-out and inventory purposes at the point of sale for grocery stores and other high volume transaction businesses. One such laser scanner provided by the assignee of the present invention is disclosed in another patent application assigned to the assignee, U.S. Ser. No. 142,083, filed Jan. 11, 1988. The scan pattern produced by this scanner is capable of finding and reading labels in as many orientations as possible. The basic requirement for using laser scanners at the point of sale is that the store check-out clerk, whether experienced or inexperienced, should not have to worry about the orientation of the label as the package is passed through the scan pattern. This scanner is advantageously oriented in a vertical orientation.

FIG. 1 is a pictorial view of a sales clerk or operator C using a vertically oriented laser scanner S at a check-out counter to scan a label L, more particularly a bar code label, on a package or product P'. The laser scanner S comprises a housing H, a window W positioned at the front FT of the scanner S, and an optical system or optical parts (not shown) within the housing H. The clerk C manually moves the package P' toward the window W of the scanner S in a direction indicated by an arrow A. The scanner S projects a laser light beam in a scan pattern (not shown) through the window W to find the bar code label L on the package P, and read the symbols thereon. The scanner S causes the laser light beam to rapidly sweep through a series of scan lines which collectively form the scan pattern to read the label L. The scan pattern is formed to achieve a high probability that at least one set of perpendicularly intersecting scan lines will cross a label to provide a successful scan by the laser scanner S.

A problem arises in providing scanners in the vertical orientation illustrated in FIG. 1. The majority of scanners produced are designed for a horizontal orientation in which the scanner is situated within a rectangular opening in the counter top with the window W generally flush with the counter top. Providing a vertically oriented scanner requires a redesigned scanner housing, adding to the expense of manufacturing such a scanner.

Accordingly, it is seen that there is a need for a scanner mounting arrangement which is capable of vertically mounting a scanner of the type which is normally mounted horizontally, without requiring significant modifications to be made to the scanner housing.

SUMMARY OF THE INVENTION

This need is met by a mounting arrangement according to the present invention for vertically mounting a scanner of the type which projects a laser light beam in a scan pattern to find a label on a package and read symbols thereon. The scanner has a housing, a window positioned on a first side of the scanner housing, power and communication cables emerging from a lateral side of the housing, and an optical system within the housing to project the beam through the window. The mounting arrangement includes a support plate for engaging a second side of the scanner housing opposite the first side, the support plate including means for securing the plate to a horizontal surface, a back cover for covering the side of the support plate on the side thereof opposite the scanner, and a cable cover, securable to the support plate and to the back cover, for covering the cables emerging from the lateral side of the housing.

The means for securing comprises a plurality of tabs in the support plate which engage openings in the second side of the housing. The back cover comprises a molded plastic cover secured to the support plate by a plurality of screws.

The support plate further comprises a base portion extending around the periphery of the bottom of the scanner for supporting the scanner thereon. The support plate is formed of sheet metal.

The cable cover comprises a molded plastic cover secured to the support plate and to the back cover by a plurality of tabs.

The means for securing comprises a plurality of tabs in the support plate which engage openings in adapter brackets secured to the second side of the housing.

Accordingly, it is an object of the present invention to provide a scanner mounting arrangement capable of mounting in a vertical orientation a scanner of the type which is normally mounted horizontally; to provide such a scanner mounting arrangement in which the scanner power and communication cables are covered; and to provide such a scanner mounting arrangement which is simplified in design and construction.

Other objects and advantages of the invention will be apparent from the following description, the accompanying drawings and the appended claims.

DETAILED DESCRIPTION OF THE PREFERRED EMBODIMENT

Figure 1:
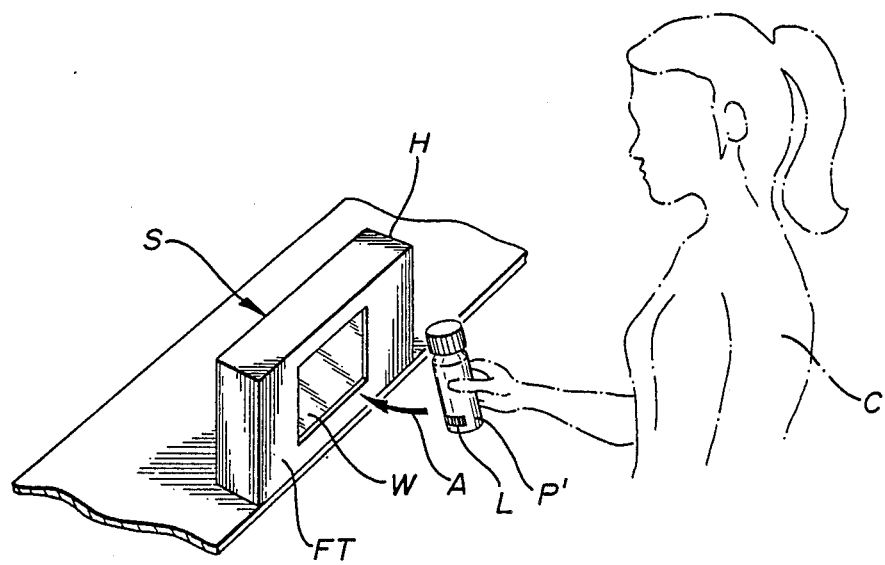
FIG. 1 is a pictorial view of a clerk directing a bar code label on a package toward the window of a laser scanner.
Figure 2:
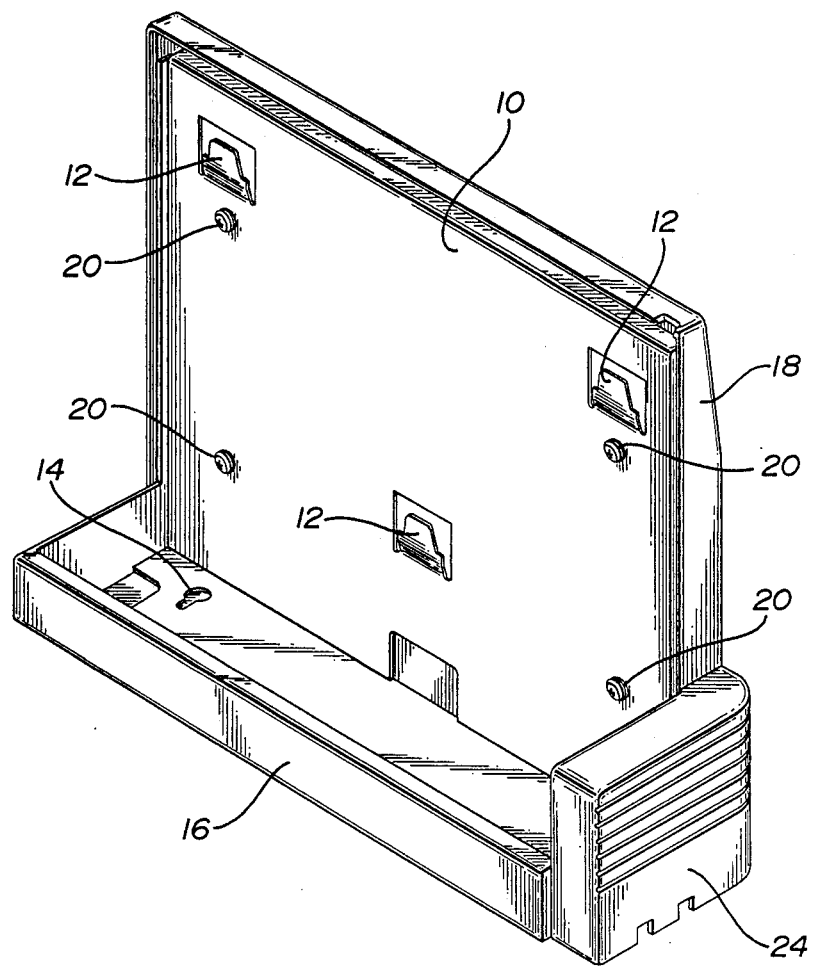
FIG. 2 is a perspective view of the mounting arrangement of the present invention.
Figure 3:
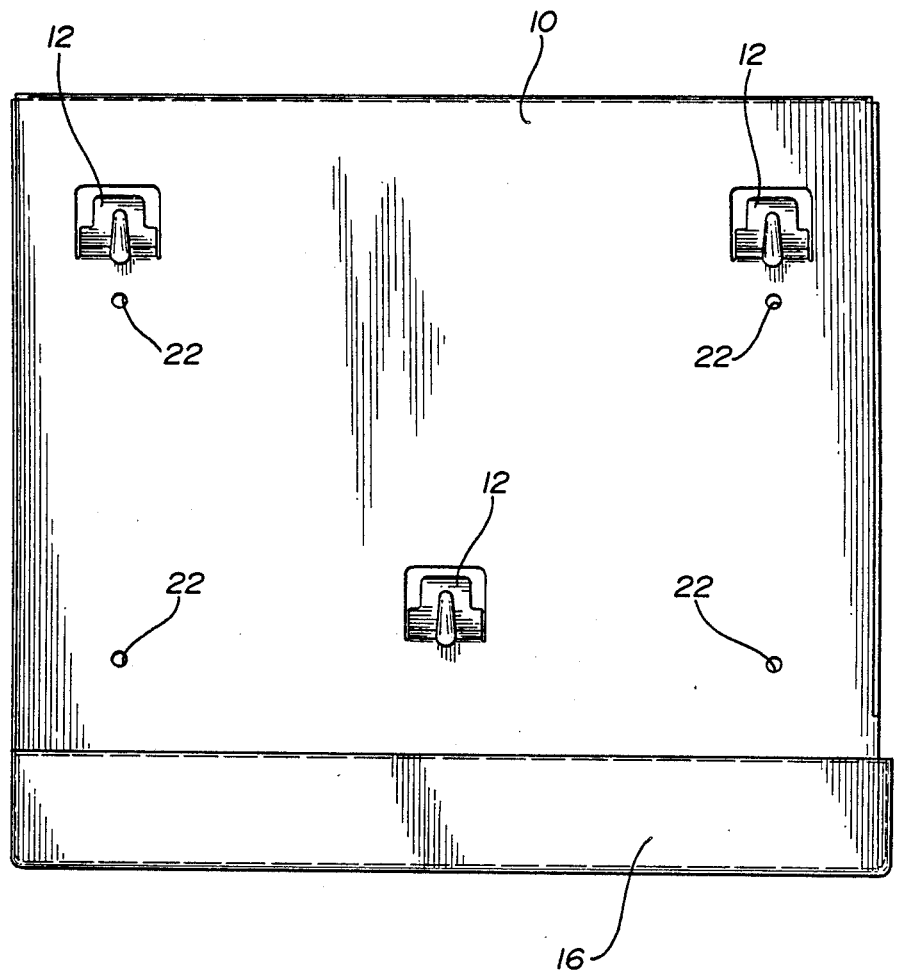
FIG. 3 is a front view of the support plate of the mounting arrangement of the present invention.
Figure 5:
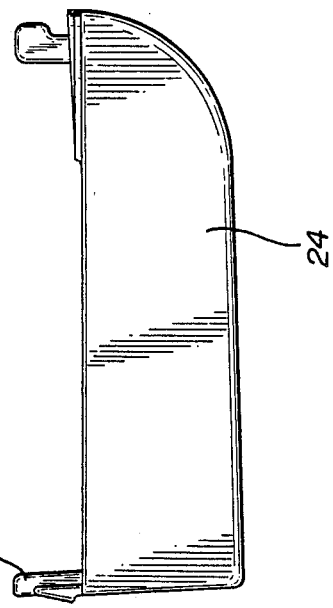
FIG. 5 is a plan view of the cable cover of the mounting arrangement of the present invention.
Figure 4:
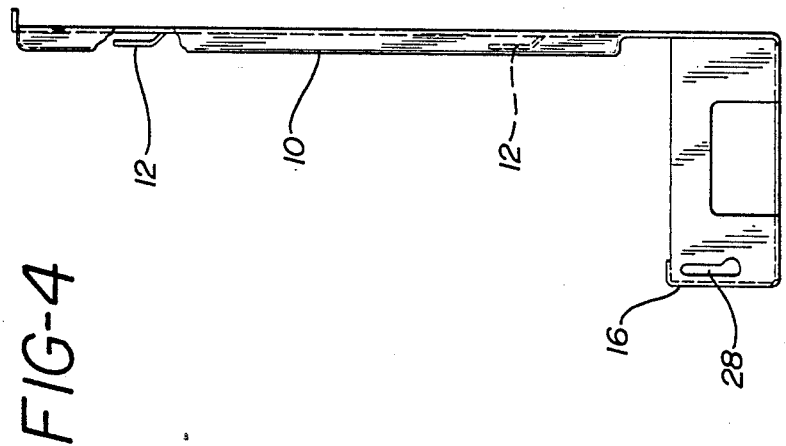
FIG. 4 is a side view of the support plate of the mounting arrangement of the present invention, as seen looking generally right to left in FIG. 3.
Figure 6:
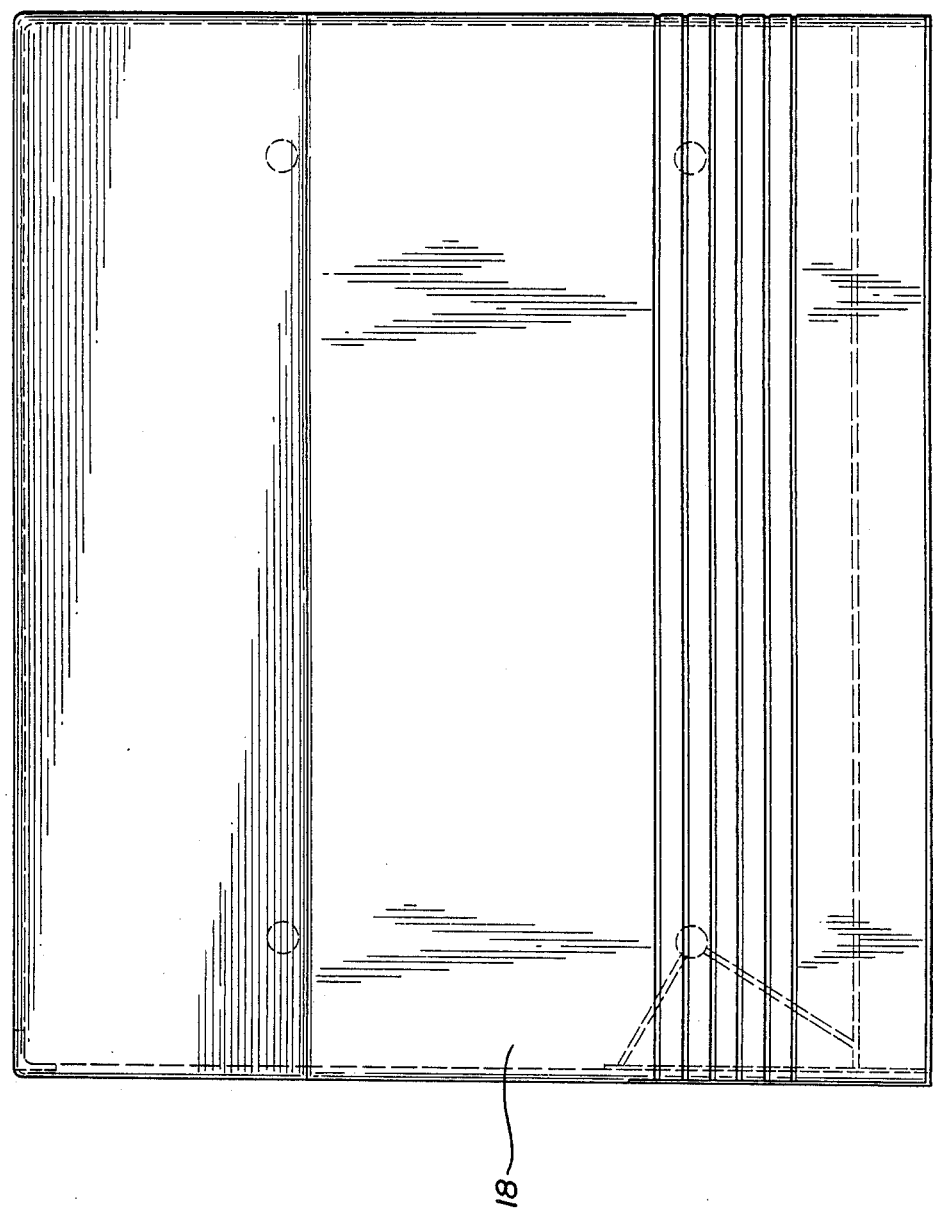
FIG. 6 is a rear view of the back cover of the mounting arrangement of the present invention.

Reference is made to FIGS. 2-6 which illustrate the mounting arrangement of the present invention. This mounting arrangement is configured to mount vertically a scanner of the type which projects a laser light beam in a scan pattern to find a label on a package and read symbols thereon. More specifically, the mounting arrangement allows the scanner to be positioned with the scanner window in a generally vertical orientation, even though the scanner may have been designed to be mounted with the scanner window in a horizontal orientation. When in the vertical orientation, such a scanner has a housing, a window positioned on a first side of the scanner housing, and power and communication cables emerging from a lateral side of the housing.

The mounting arrangement of the present invention includes a support plate 10 for engaging a second side of the scanner housing opposite the side of the housing on which the window is positioned. The support plate 10, preferably formed of sheet metal, includes a plurality of tabs 12 which provide a means for securing the plate 10 to the side of the scanner housing, preferably by engaging slots in the housing or in attachment brackets secured to the housing. The support plate 10 includes a plurality of openings 14 through which screws or bolts (not shown) extend, providing a means for securing the plate 10 to a horizontal surface. The plate 10 further includes a base portion 16 extending around the periphery of the bottom of the scanner for supporting the scanner thereon.

The mounting arrangement also includes a back cover 18 for covering the side of the support plate 10 on the side thereof opposite the scanner. The back cover 18 comprises a molded plastic cover which is secured to the support plate 10 by a plurality of screws 20 which pass through openings 22.

Finally, the mounting arrangement includes a cable cover 24. Cover 24 is secured to the support plate 10 by tabs 26 which lock into opening 28. Similarly, cover 24 is secured to back cover 18 by tabs 30 which engage openings (not shown) in the side of cover 18. The cable cover 24 covers the power and communication cables which emerge from the lateral side of the scanner housing. The cable cover 24 also covers an opening in the horizontal support surface through which the cables pass.

It will be appreciated that the mounting arrangement of the present invention is highly advantageous in a number of respects. The arrangement may be easily assembled and secured to a horizontal support surface. Furthermore, the mounting arrangement permits simple removal of a scanner when required for servicing. Additionally, the mounting arrangement of the present invention provides an attractive manner in which to mount a scanner in a vertical orientation.

Having described the invention in detail and by reference to the preferred embodiment thereof, it will be apparent that other modifications and variations are possible without departing from the scope of the invention defined in the appended claims.

What is claimed is:

1. A mounting arrangement for vertically mounting a scanner of the type which projects a laser light beam in a scan pattern to find a label on a package and read symbols thereon, said scanner having a housing, a window positioned on a first side of the scanner housing, power and communication cables emerging from a lateral side of said housing, and an optical system within the housing to project the beam through the window, comprising:
   a support plate for engaging a second side of the scanner housing opposite said first side, said support plate including means for securing said plate to a horizontal surface,
   a back cover for covering the side of said support plate on the side thereof opposite said scanner, and
   a cable cover, securable to said support plate and to said back cover, for covering said cables emerging from said lateral side of said housing.

2. The mounting arrangement of claim 1 in which said means for securing comprises a plurality of tabs in said support plate which engage openings in said second side of said housing.

3. The mounting arrangement of claim 1 in which said back cover comprises a molded plastic cover secured to said support plate by a plurality of screws.

4. The mounting arrangement of claim 1 in which said support plate further comprises a base portion extending around the periphery of the bottom of said scanner for supporting said scanner thereon.

5. The mounting arrangement of claim 4 in which said support plate is formed of sheet metal.

6. The mounting arrangement of claim 1 in which said cable cover comprises a molded plastic cover secured to said support plate and to said back cover by a plurality of tabs.

7. The mounting arrangement of claim 1 in which said means for securing comprises a plurality of tabs in said support plate which engage openings in adapter brackets secured to said second side of said housing.

8. A mounting arrangement for vertically mounting a scanner of the type which projects a laser light beam in a scan pattern to find a label on a package and read symbols thereon, said scanner having a housing, a window positioned on a first side of the scanner housing, power and communication cables emerging from a lateral side of said housing, and an optical system within the housing to project the beam through the window, comprising:
   a support plate for engaging a second side of the scanner housing opposite said first side, said support plate including means for securing said plate to a horizontal surface, and a base portion extending around the periphery of the bottom of said scanner for supporting said scanner thereon, and
   a back cover for covering the side of said support plate on the side thereof opposite said scanner.

9. The mounting arrangement of claim 8 in which said mounting arrangement further comprises a cable cover, securable to said support plate and to said back cover, for covering said cables emerging from said lateral side of said housing.

10. The mounting arrangement of claim 8 in which said means for securing comprises a plurality of tabs in said support plate which engage openings in said second side of said housing.

11. The mounting arrangement of claim 8 in which said back cover comprises a molded plastic cover secured to said support plate by a plurality of screws.

12. The mounting arrangement of claim 8 in which said support plate is formed of sheet metal.

13. The mounting arrangement of claim 8 in which said cable cover comprises a molded plastic cover secured to said support plate and to said back cover by a plurality of tabs.

14. The mounting arrangement of claim 8 in which said means for securing comprises a plurality of tabs in said support plate which engage openings in adapter brackets secured to said second side of said housing.

* * * * *